US008068038B2

(12) United States Patent
Engels et al.

(10) Patent No.: US 8,068,038 B2
(45) Date of Patent: Nov. 29, 2011

(54) SYSTEM AND METHOD FOR RENDERING A PRIMARY FLIGHT DISPLAY HAVING A CONFORMAL TERRAIN AVOIDANCE GUIDANCE ELEMENT

(75) Inventors: Jary Engels, Peoria, AZ (US); Thea L. Feyereisen, Hudson, WI (US); Aaron Gannon, Anthem, AZ (US); Gang He, Morristown, NJ (US); Ivan Sandy Wyatt, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 401 days.

(21) Appl. No.: 12/366,448

(22) Filed: Feb. 5, 2009

(65) Prior Publication Data

US 2010/0194602 A1 Aug. 5, 2010

(51) Int. Cl.
*G08B 23/00* (2006.01)

(52) U.S. Cl. ............ 340/970; 340/973; 340/974; 701/9; 701/14

(58) Field of Classification Search .................. 340/961, 340/963, 970, 973–975, 977, 980; 701/3, 701/4, 9, 14, 301
See application file for complete search history.

(56) References Cited

U.S. PATENT DOCUMENTS

| 5,838,262 | A | 11/1998 | Kershner et al. | |
| 6,021,374 | A * | 2/2000 | Wood | 701/301 |
| 6,484,072 | B1 * | 11/2002 | Anderson et al. | 701/9 |
| 6,691,004 | B2 * | 2/2004 | Johnson et al. | 701/14 |
| 7,463,954 | B1 * | 12/2008 | He | 701/3 |
| 2004/0160341 | A1 * | 8/2004 | Feyereisen et al. | 340/970 |
| 2004/0181318 | A1 * | 9/2004 | Redmond et al. | 701/9 |
| 2004/0239529 | A1 * | 12/2004 | Tran | 340/961 |
| 2006/0097895 | A1 * | 5/2006 | Reynolds et al. | 340/961 |

FOREIGN PATENT DOCUMENTS

| EP | 2148176 A1 | 1/2010 |
| WO | 2008145590 A2 | 12/2008 |

OTHER PUBLICATIONS

EP Search Report, EP 10151847.0-1236 dated May 31, 2010.

* cited by examiner

*Primary Examiner* — Brent Swarthout
(74) *Attorney, Agent, or Firm* — Ingrassia Fisher & Lorenz, P.C.

(57) ABSTRACT

A flight deck display system and related operating methods for an aircraft are provided. The system includes a processor architecture and a display element coupled to the processor architecture. The processor architecture is configured to receive real-time aircraft data and terrain data for the aircraft and, based upon the real-time aircraft data and the terrain data, generate image rendering display commands. The display element receives the image rendering display commands and, in response thereto, renders a primary flight display that includes a conformal view of terrain corresponding to a flight deck viewpoint. The primary flight display also includes a conformal terrain avoidance guidance (TAG) element on the view of terrain. The TAG element includes visual indicia of a desired navigation path that is intended to avoid terrain that obstructs a current flight path of the aircraft.

18 Claims, 7 Drawing Sheets

SYSTEM AND METHOD FOR RENDERING A PRIMARY FLIGHT DISPLAY HAVING A CONFORMAL TERRAIN AVOIDANCE GUIDANCE ELEMENT

TECHNICAL FIELD

Embodiments of the subject matter described herein relate generally to avionics systems such as flight display systems. More particularly, embodiments of the subject matter relate to a flight deck display system that generates a perspective view of terrain on a primary flight deck display, along with a conformal graphical element that serves as a pull up reference that can be used for pilot guidance to avoid terrain.

BACKGROUND

Modern flight deck displays for vehicles (such as aircraft or spacecraft) display a considerable amount of information, such as vehicle position, speed, altitude, attitude, navigation, target, and terrain information. In the case of an aircraft, most modern displays additionally display a flight plan from different views, either a lateral view, a vertical view, or a perspective view, which can be displayed individually or simultaneously on the same display.

The lateral view, generally known as a lateral map display, is basically a top-view of the flight plan, and may include, for example, a top-view aircraft symbol, waypoint symbols, line segments that interconnect the waypoint symbols, and range rings. The lateral map may also include various map features including, for example, weather information, terrain information, political boundaries, and navigation aids. The terrain information may include situational awareness (SA) terrain, as well as terrain cautions and warnings which, among other things, may indicate terrain that may obstruct the current flight path of the aircraft. The perspective view provides a three-dimensional view of the vehicle flight plan and may include one or more of the above-mentioned features that are displayed on the lateral map, including the terrain information. In this regard, some modern flight deck display systems incorporate a synthetic terrain display, which generally represents a virtual or computer simulated view of terrain rendered in a conformal manner.

A flight deck display system may cooperate with a terrain avoidance and warning system (TAWS) that generates alerts when the aircraft is proximate to or is approaching terrain that might represent a potential flight path conflict. Traditional TAWS alerts include audible messages (such as a computer generated or recorded voice that says "TERRAIN AHEAD" or "PULL UP") and/or visual notifications (such as a popup graphic that appears on the lateral view or the perspective view). For example, FIG. 1 is a schematic representation of a conventional lateral map display 10 that includes a top view of terrain 12, an aircraft symbol 14, and a range circle 16 that indicates a range of ten miles surrounding the aircraft. Lateral map display 10 depicts a condition where the current flight path of the aircraft might conflict with some approaching terrain. Consequently, the TAWS generates an alert or command that causes the flight deck display system to render a graphical message 18 on lateral map display 10. Some flight deck display systems also graphically highlight potentially conflicting terrain that corresponds to a TAWS alert. For example, non-conflicting terrain that is relatively far from the current flight path could be rendered in a green color, while potentially conflicting terrain could be rendered in a red or amber color. In FIG. 1, for example, potentially conflicting terrain 20 has been rendered in manner that contrasts with the remainder of the terrain.

BRIEF SUMMARY

A flight deck display element for an aircraft is provided. The flight deck display element has rendered thereon a primary flight display that includes a view of terrain corresponding to a viewpoint from the flight deck, a flight path symbol that represents a flight path of the aircraft, the flight path symbol being rendered in a conformal manner relative to the view of terrain, and a terrain avoidance guidance (TAG) element rendered in a conformal manner relative to the view of terrain.

A flight deck display system for an aircraft is also provided. The system includes a processor architecture configured to receive real-time aircraft data and terrain data for the aircraft and, based upon the real-time aircraft data and the terrain data, generate image rendering display commands. The system also includes a display element that receives the image rendering display commands and, in response thereto, renders a primary flight display that includes a conformal view of terrain corresponding to a flight deck viewpoint, and that comprises a conformal TAG element on the view of terrain. The TAG element includes indicia of a desired navigation path intended to avoid terrain that obstructs a current flight path of the aircraft.

A method for displaying information on a flight deck display element of an aircraft is also provided. The method involves receiving terrain avoidance and warning system (TAWS) data for the aircraft, receiving terrain data corresponding to a flight deck viewpoint, and in response to the TAWS data and the terrain data, displaying a primary flight display on the flight deck display element. The primary flight display includes a conformal view of terrain corresponding to the terrain data, a flight path symbol that represents a current flight path of the aircraft, and a conformal TAG element that visually indicates aircraft control parameters that when executed will cause the aircraft to clear conflicting terrain that obstructs the current flight path of the aircraft.

Also provided is a method for a flight deck system of an aircraft. This method begins by receiving TAWS data for the aircraft. The method detects when the TAWS data indicates the presence of conflicting terrain that obstructs a current flight path of the aircraft and, in response thereto, calculates aircraft control parameters that when executed will cause the aircraft to avoid the conflicting terrain. The method also generates indicia of the aircraft control parameters, using the flight deck system.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
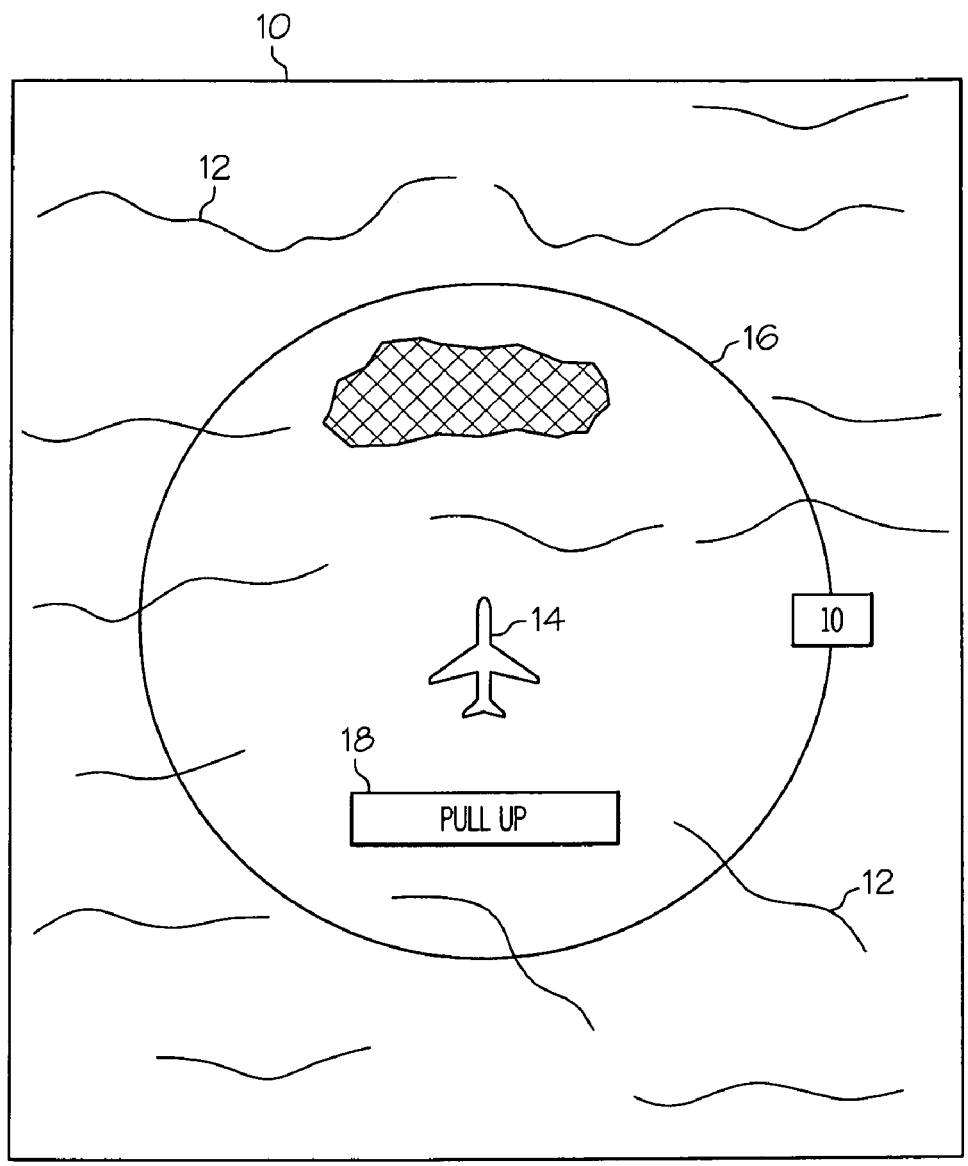
FIG. 1 is a graphical representation of a conventional lateral map display.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 2 depicts one exemplary arrangement of elements, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard," and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

The subject matter described herein relates to a primary flight deck display element and related systems and operating methods. The primary flight deck display element is used to render a virtual perspective view of terrain in real-time (or substantially real-time), where the rendered terrain is conformal such that it simulates a cockpit view. The terrain fills the main or primary display region, and the primary display region also accommodates the dynamic and selective rendering of a terrain avoidance guidance (TAG) element, which is rendered such that it is conformal to the terrain. Notably, unlike traditional pull up alerts or terrain avoidance warnings, the TAG element visually communicates navigation and control instructions, guidelines, or preferences to the pilot when potentially conflicting terrain is approaching. This visual guidance can indicate how much control authority is required to safely clear the approaching terrain. Accordingly, the pilot will be able to quickly and easily determine how best to navigate the aircraft around the offending terrain. Preferred embodiments coordinate the TAG element with a rendered flight path symbol in an intuitive manner, such that pilot can visually determine where to direct the aircraft (and, therefore, the flight path symbol) to extinguish the terrain avoidance warning.

Figure 2:
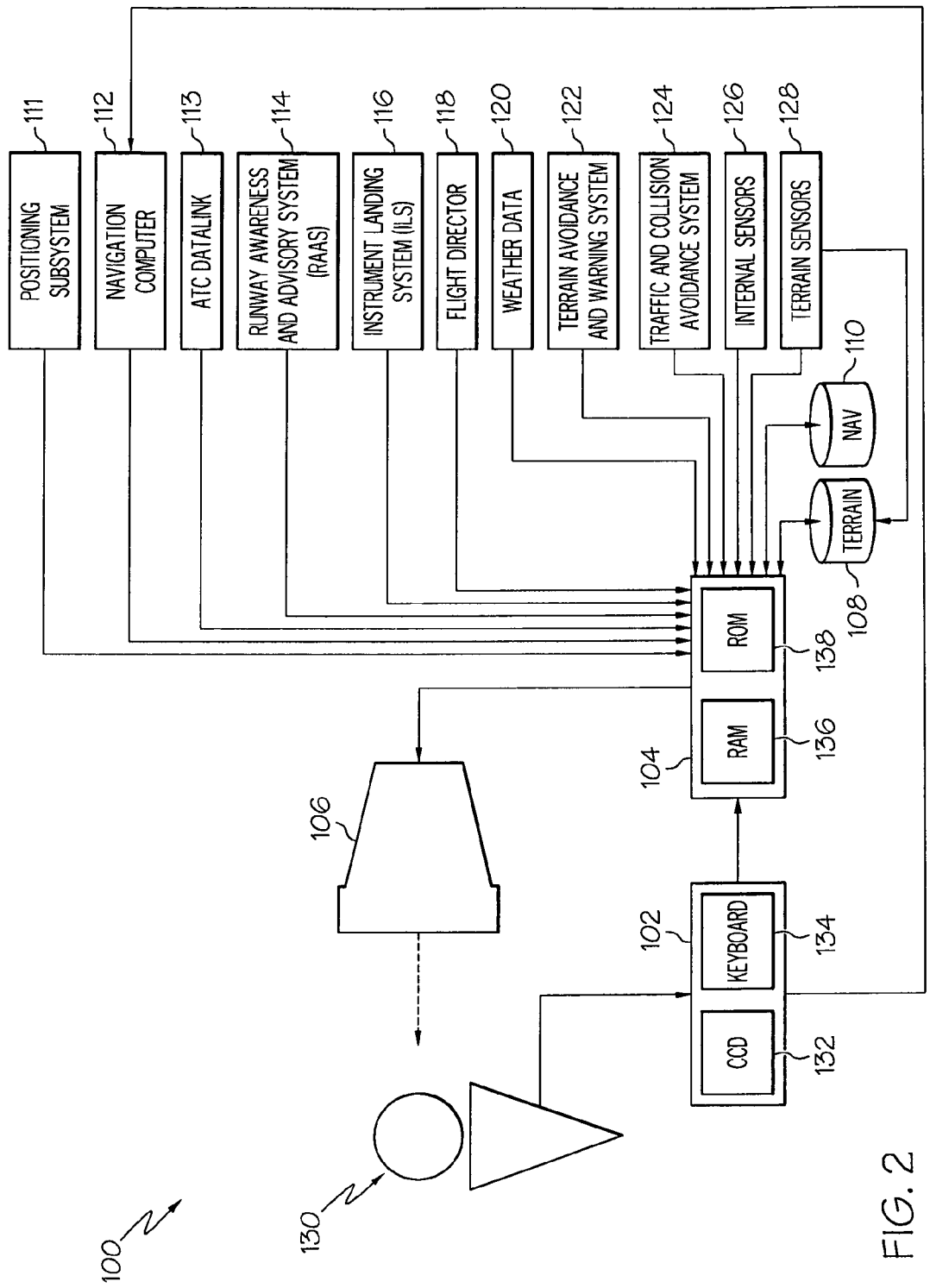
FIG. 2 is a schematic representation of an embodiment of a flight deck display system.

FIG. 2 depicts an exemplary flight deck display system 100 that generally includes, without limitation: a user interface 102; a processor architecture 104 coupled to user interface 102; and a display element 106 coupled to processor architecture 104. System 100 may also include, cooperate with, and/or communicate with a number of databases, sources of data, or the like. Moreover, system 100 may include, cooperate with, and/or communicate with a number of external subsystems as described in more detail below. For example, processor architecture 104 may cooperate with one or more of the following components, features, data sources, and subsystems, without limitation: one or more terrain databases 108; one or more navigation databases 110; a positioning subsystem 111; a navigation computer 112; an air traffic control (ATC) datalink 113; a runway awareness and advisory system (RAAS) 114; an instrument landing system (ILS) 116; a flight director 118; a source of weather data 120; a terrain avoidance and warning system (TAWS) 122; a traffic and collision avoidance system (TCAS) 124; one or more inertial sensors 126; and one or more terrain sensors 128.

User interface 102 is in operable communication with processor architecture 104 and is configured to receive input from a user 130 (e.g., a pilot) and, in response to the user input, supply command signals to processor architecture 104. User interface 102 may be any one, or combination, of various known user interface devices including, but not limited to, a cursor control device (CCD) 132, such as a mouse, a trackball, or joystick, one or more buttons, switches, or knobs. In the depicted embodiment, user interface 102 includes CCD 132 and a keyboard 134. The user 130 manipulates CCD 132 to, among other things, move cursor symbols that might be rendered at various times on display element 106, and the user 130 may manipulate keyboard 134 to, among other things, input textual data. As depicted in FIG. 1, user interface 102 may also be utilized to enable user interaction with navigation computer 112, the flight management system, and/or other features and components of the aircraft.

Processor architecture 104 may utilize one or more known general-purpose microprocessors or an application specific processor that operates in response to program instructions.

In the depicted embodiment, processor architecture 104 includes or communicates with onboard RAM (random access memory) 136, and onboard ROM (read only memory) 138. The program instructions that control processor architecture 104 may be stored in either or both RAM 136 and ROM 138. For example, the operating system software may be stored in ROM 138, whereas various operating mode software routines and various operational parameters may be stored in RAM 136. It will be appreciated that this is merely exemplary of one scheme for storing operating system software and software routines, and that various other storage schemes may be implemented. It will also be appreciated that processor architecture 104 may be implemented using various other circuits, not just a programmable processor. For example, digital logic circuits and analog signal processing circuits could also be used.

Processor architecture 104 is in operable communication with terrain database 108, navigation database 110, and display element 106, and is coupled to receive various types of data, information, commands, signals, etc., from the various sensors, data sources, instruments, and subsystems described herein. For example, processor architecture 104 is suitably configured to obtain and process avionics-related data as needed to generate a graphical and perspective (three dimensional) representation of terrain in a primary display region, along with a dynamic TAG element that appears within the primary display region when approaching terrain might present a flight path conflict. The graphical features and characteristics of a number of exemplary primary flight displays are described below with reference to FIGS. 3-6.

In certain embodiments, processor architecture 104 is configured to respond to inertial data obtained by inertial sensors 126 to selectively retrieve terrain data from terrain database 108 or terrain sensor 128, and to selectively retrieve navigation data from navigation database 110. Processor architecture 104 can also supply appropriate display commands to display element 106, so that the retrieved terrain and navigation data are appropriately displayed on display element 106. Processor architecture 104 may be further configured to receive real-time (or virtually real-time) airspeed, altitude, attitude, waypoint, and/or geographic position data for the aircraft and, based upon that data, generate image rendering display commands associated with the display of terrain and the TAG element. The preferred manner in which the TAG element is displayed on display element 106 will be described in more detail below.

Display element 106 is used to display various images and data, in both a graphical and a textual format, and to supply visual feedback to the user 130 in response to the user input commands supplied by the user 130 to user interface 102. It will be appreciated that display element 106 may be any one of numerous known displays suitable for rendering image and/or text data in a format viewable by the user 130. Non-limiting examples of such displays include various cathode ray tube (CRT) displays, and various flat panel displays such as, various types of LCD (liquid crystal display), OLED, and TFT (thin film transistor) displays. Display element 106 may additionally be based on a panel mounted display, a HUD projection, or any known technology. In an exemplary embodiment, display element 106 includes a panel display, and display element 106 is suitably configured to receive image rendering display commands from processor architecture 104 and, in response thereto, display element 106 renders a primary display region having a perspective view of terrain corresponding to a flight deck viewpoint, and a dynamic and conformal TAG element (as needed). To provide a more complete description of the operating method that is implemented by system 100, a general description of exemplary primary flight displays and various graphical features rendered thereon will be provided below with reference to FIGS. 3-6.

As FIG. 1 shows, processor architecture 104 is in operable communication with the source of weather data 120, TAWS 122, and TCAS 124, and is additionally configured to generate, format, and supply appropriate display commands to display element 106 so that the avionics data, weather data 120, data from TAWS 122, data from TCAS 124, and data from the previously mentioned external systems may also be selectively rendered in graphical form on display element 106. The data from TCAS 124 can include Automatic Dependent Surveillance Broadcast (ADS-B) messages.

Terrain database 108 includes various types of data, including elevation data, representative of the terrain over which the aircraft is flying. The terrain data can be used to generate a three dimensional perspective view of terrain in a manner that appears conformal to the earth. In other words, the display emulates a realistic view of the terrain from the flight deck or cockpit perspective. The data in terrain database 108 can be pre-loaded by external data sources or provided in real-time by terrain sensor 128. Terrain sensor 128 provides real-time terrain data to processor architecture 104 and/or terrain database 108. In one embodiment, terrain data from terrain sensor 128 is used to populate all or part of terrain database 108, while in another embodiment, terrain sensor 128 provides information directly, or through components other than terrain database 108, to processor architecture 104.

In another embodiment, terrain sensor 128 can include visible, low-light TV, infrared, lidar, or radar-type sensors that collect and/or process terrain data. For example, terrain sensor 128 can be a radar sensor that transmits radar pulses and receives reflected echoes, which can be amplified to generate a radar signal. The radar signals can then be processed to generate three-dimensional orthogonal coordinate information having a horizontal coordinate, vertical coordinate, and depth or elevation coordinate. The coordinate information can be stored in terrain database 108 or processed for display on display element 106.

In one embodiment, the terrain data provided to processor architecture 104 is a combination of data from terrain database 108 and terrain sensor 128. For example, processor architecture 104 can be programmed to retrieve certain types of terrain data from terrain database 108 and other certain types of terrain data from terrain sensor 128. In one embodiment, terrain data retrieved from terrain sensor 128 can include moveable terrain, such as mobile buildings and systems. This type of terrain data is better suited for terrain sensor 128 to provide the most up-to-date data available. For example, types of information such as waterbody information and geopolitical boundaries can be provided by terrain database 108. When terrain sensor 128 detects, for example, a waterbody, the existence of such can be confirmed by terrain database 108 and rendered in a particular color such as blue by processor architecture 104.

Navigation database 110 includes various types of navigation-related data stored therein. In preferred embodiments, navigation database 110 is an onboard database that is carried by the aircraft. The navigation-related data include various flight plan related data such as, for example, and without limitation: waypoint location data for geographical waypoints; distances between waypoints; track between waypoints; data related to different airports; navigational aids; obstructions; special use airspace; political boundaries; communication frequencies; and aircraft approach information. In one embodiment, combinations of navigation-related data and terrain data can be displayed. For example, terrain data gathered by terrain sensor 128 and/or terrain database 108 can be displayed with navigation data such as waypoints, airports, etc. from navigation database 110, superimposed thereon.

Although terrain database 108 and navigation database 110 are, for clarity and convenience, shown as being stored separate from processor architecture 104, all or portions of either or both of these databases 108, 110 could be loaded into the onboard RAM 136, stored in ROM 138, or integrally formed as part of processor architecture 104. Terrain database 108 and navigation database 110 could also be part of a device or system that is physically separate from system 100.

Positioning subsystem 111 is suitably configured to obtain position data for the aircraft. In practice, positioning subsystem 111 monitors the current position of the aircraft in real-time, and the real-time position data can be used by one or more other subsystems, processing modules, or equipment on the aircraft (e.g., navigation computer 112, RAAS 114, ILS 116, flight director 118, TAWS 122, or TCAS 124). In certain embodiments, positioning subsystem 111 is realized using global positioning system (GPS) technologies that are commonly deployed in avionics applications. Thus, the position data obtained by positioning subsystem 111 may represent the latitude and longitude of the aircraft in an ongoing and continuously updated manner.

The avionics data that is supplied from inertial sensors 126 includes data representative of the state of the aircraft such as, for example, aircraft speed, altitude, attitude (i.e., pitch and roll), and heading. Inertial sensors 126 can include MEMS-based, ADHRS-related, or any other type of inertial sensor. Inertial sensors 126 may include at least one sensor that is suitably configured to obtain altitude data for the aircraft, where the altitude data represents the current real-time altitude of the aircraft. As understood by those familiar with avionics instruments, the altitude data is preferably updated in a continuous and ongoing manner.

The weather data 120 supplied to processor architecture 104 is representative of at least the location and type of various weather cells. The data supplied from TCAS 124 includes data representative of other aircraft in the vicinity, which may include, for example, speed, direction, altitude, and altitude trend. In a preferred embodiment, processor architecture 104, in response to the TCAS data, supplies appropriate display commands to display element 106 such that a graphic representation of each aircraft in the vicinity is displayed on display element 106. TAWS 122 supplies data representative of the location of terrain that may be a threat to the aircraft. Processor architecture 104, in response to the TAWS data, preferably supplies appropriate display commands to display element 106 such that the potential threat terrain is displayed in various colors depending on the level of threat. This traditional role of TAWS data was described above with reference to lateral map display 10 of FIG. 1. For example, red is used for warnings (immediate danger), yellow is used for cautions (possible danger), and green is used for terrain that is not a threat. It will be appreciated that these colors and number of threat levels are merely exemplary, and that other colors and different numbers of threat levels can be provided as a matter of choice.

The TAWS data is also utilized to initiate the rendering (and removal) of a conformal TAG element on display element 106 as needed in real-time. As explained in more detail below, the TAWS data can be processed in a suitable manner such that the shape, size, dynamic characteristics, position, and/or other display characteristics of the TAG element are influenced by the TAWS data.

As was previously alluded to, one or more other external systems (or subsystems) may also provide avionics-related data to processor architecture 104 for display on display element 106. In the depicted embodiment, these external systems include a flight director 118, an instrument landing system (ILS) 116, a runway awareness and advisory system (RAAS) 114, and a navigation computer 112. Flight director 118, as is generally known, supplies command data representative of commands for piloting the aircraft in response to flight crew entered data, or various inertial and avionics data received from external systems. The command data supplied by flight director 118 may be supplied to processor architecture 104 and displayed on display element 106 for use by the user 130, or the data may be supplied to an autopilot (not illustrated). The autopilot, in turn, produces appropriate control signals that cause the aircraft to fly in accordance with the flight crew entered data, or the inertial and avionics data.

ILS 116 is a radio navigation system that provides the aircraft with horizontal and vertical guidance just before and during landing and, at certain fixed points, indicates the distance to the reference point of landing. The system includes ground-based transmitters (not shown) that transmit radio frequency signals. ILS 116 onboard the aircraft receives these signals and supplies appropriate data to the processor for display of, for example, an ILS feather (not shown in FIG. 2) on the display element 106. The ILS feather represents two signals, a localizer signal that is used to provide lateral guidance, and a glide slope signal that is used for vertical guidance.

RAAS 114 provides improved situational awareness to help lower the probability of runway incursions by providing timely aural advisories to the flight crew during taxi, takeoff, final approach, landing and rollout. RAAS 114 uses GPS data to determine aircraft position and compares aircraft position to airport location data stored in navigation database 110. Based on these comparisons, RAAS 114, if necessary, issues appropriate aural advisories. Aural advisories, which may be issued by RAAS 114, inform the user 130, among other things of when the aircraft is approaching a runway, either on the ground or from the air at times such as when the aircraft has entered and is aligned with a runway, when the runway is not long enough for the particular aircraft, the distance remaining to the end of the runway as the aircraft is landing or during a rejected takeoff, when the user 130 inadvertently begins to take off from a taxiway, and when an aircraft has been immobile on a runway for an extended time. During approach, data from sources such as GPS, including RNP and RNAV, can also be considered.

Navigation computer 112 is used, among other things, to allow the user 130 to program a flight plan from one destination to another. Navigation computer 112 may be in operable communication with flight director 118. As was mentioned above, flight director 118 may be used to automatically fly, or assist the user 130 in flying, the programmed route. Navigation computer 112 is in operable communication with various databases including, for example, terrain database 108, and navigation database 110. Processor architecture 104 may receive the programmed flight plan data from navigation computer 112 and cause the programmed flight plan, or at least portions thereof, to be displayed on display element 106.

ATC datalink 113 is utilized to provide air traffic control data to system 100, preferably in compliance with known standards and specifications. Using ATC datalink, processor architecture 104 can receive air traffic control data from ground based air traffic controller stations and equipment. In turn, system 100 can utilize such air traffic control data as needed.

In operation, a flight deck display system as described herein is suitably configured to process current status data for the host aircraft and generate a primary flight display having graphical features and characteristics that are influenced by the current status data. The current status data for a given aircraft may include, without limitation: flight plan data; geographic position data; altitude data; attitude (roll and pitch) data; terrain data; or the like. In response to the current status data, the display system can generate and display an appropriately formatted image on its display element.

Under certain flight conditions, the system renders a perspective cockpit view of terrain, along with a graphical TAG element that is conformal to the terrain. The TAG element is a graphical symbol or feature that is displayed when the TAWS is issuing an alert or warning, e.g., a PULL UP warning. The TAG element includes a section, region, or feature that represents or indicates a flight path command that, when followed, causes the aircraft to climb, bank, or otherwise navigate safely around and/or above the offending terrain by at least a designated margin (e.g., 500 feet). The dimensions, location, and other characteristics of the TAG element can be calculated in an appropriate manner using data from the TAWS, GPS, air data computer, onboard inertial sensors, or the like.

Figure 3:
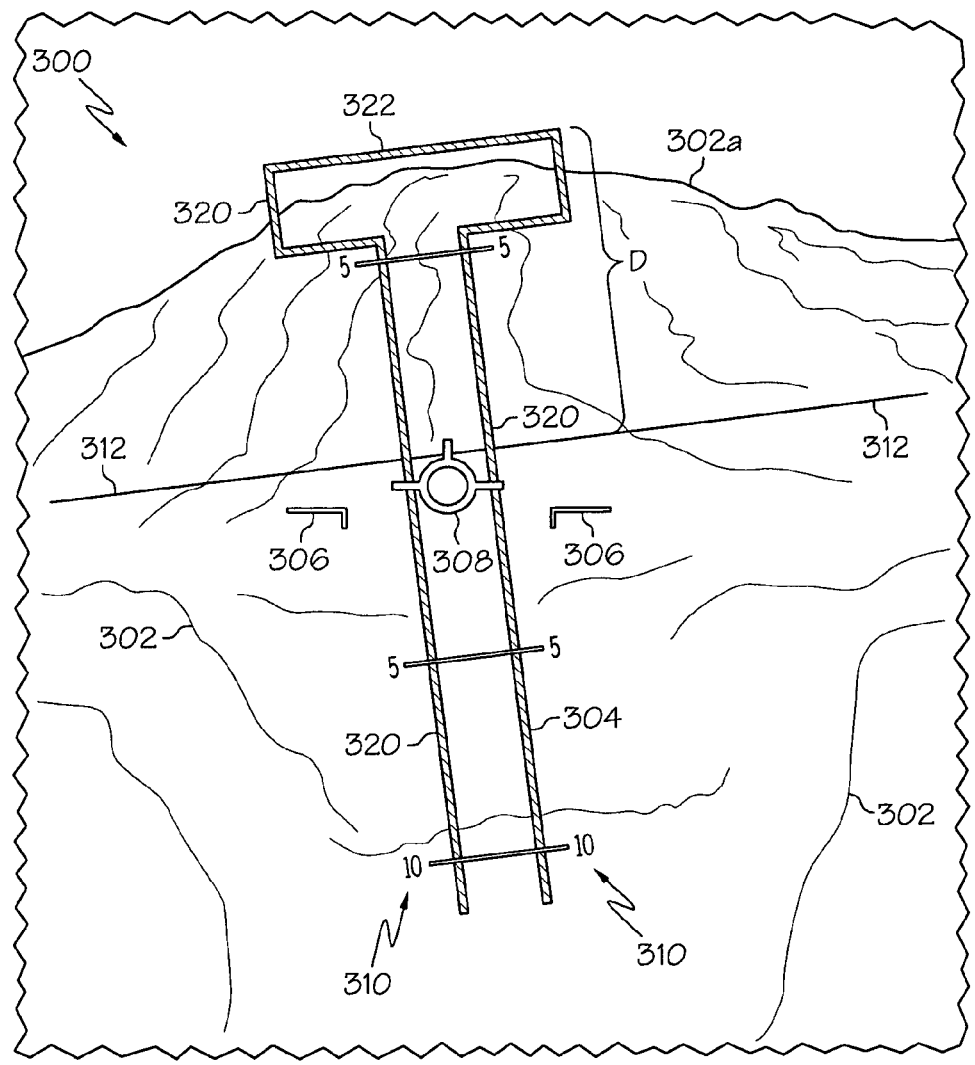
FIGS. 3-6 are graphical representations of terrain avoidance guidance elements suitable for use with a primary flight display.

In this regard, FIGS. 3-6 are graphical representations of TAG elements suitable for use with a primary flight display. FIG. 3 depicts one preferred embodiment of a graphical primary flight display 300 corresponding to a flight condition where potentially conflicting terrain has been detected. Primary flight display 300 includes graphical representations and images of a number of display elements. This embodiment of primary flight display 300 generally includes, without limitation: a perspective view of terrain 302; a TAG element 304; an aircraft reference symbol 306; a flight path symbol 308; a pitch ladder scale 310; and a zero pitch reference indicator 312. Primary flight display 300 may also include a number of additional elements, graphical features, and/or information as desired for the deployment. In this regard, the content of the display shown in FIG. 3 has been simplified for ease of description and clarity of illustration—in practice, primary flight display 300 may also contain graphical elements corresponding to or representing: an airspeed tape; an altimeter tape; a compass or horizontal situation indicator; a lateral map (see FIG. 1); waypoint markers; flight plan indicia; flight data; numerical information; pilot guidance elements; trend data; and the like.

As explained previously, the perspective view of terrain 302 can be continuously updated in substantially real-time such that it emulates the pilot's cockpit view in a manner that is conformal to the actual surrounding environment. FIG. 3 depicts a situation where terrain 302 includes some conflicting terrain 302a (depicted as a mountain) that corresponds to actual terrain that obstructs the current flight path of the aircraft. In this regard, the present flight path of the aircraft—as indicated by flight path symbol 308—is headed into the conflicting terrain 302a, which explains why TAG element 304 has been displayed. In preferred embodiments, TAG element 304 remains displayed until the potential conflict has been resolved and the flight path of the aircraft is clear and unobstructed. TAG element 304 provides visual indicia and visual navigation guidance to the pilot or flight crew. More specifically, TAG element 304 graphically indicates where the aircraft needs to be headed in order to clear the obstacle. In this embodiment, the uppermost boundary of TAG element 304 roughly corresponds to a flight path target that will provide safe passage over the terrain. Consequently, the pilot can quickly and easily determine where to fly, and TAG element 304 can be used as a navigation aid for flight path symbol 308. These aspects of TAG element 304 will be described in more detail below.

Aircraft reference symbol 306, which includes two wing-shaped elements in this embodiment, represents the aircraft position as a reference for other graphical features of primary flight display 300. In certain embodiments, aircraft reference symbol 306 is rendered in a noticeable color (such as white), pattern, and/or brightness. Aircraft reference symbol 306 is rendered in a "fixed" position relative to primary flight display 300. In other words, one can imagine that aircraft reference symbol 306 is "etched into the glass" used for primary flight display 300.

For this example, flight path symbol 308 is rendered as a circle with horizontal and/or vertical marks extending from the circle. In certain embodiments, flight path symbol 308 is rendered in a noticeable color (such as bright green), pattern, and/or brightness. Flight path symbol 308 represents the current flight path of the aircraft, and it is preferably rendered in a conformal manner relative to terrain 302. During flight, the flight path symbol 308 moves within the display area such that it generally indicates the direction in which the aircraft is currently moving. For example, if the aircraft is descending, then flight path symbol 308 will appear below zero pitch reference indicator 312. Conversely, if the aircraft is climbing, then flight path symbol 308 will appear above zero pitch reference indicator 312.

Pitch ladder scale 310 includes a number of parallel marks and/or alphanumeric characters that indicate the pitch of the aircraft using any convenient scale. In certain embodiments, pitch ladder scale 310 is rendered in a white color. Notably, zero pitch on pitch ladder scale 310 corresponds to zero pitch reference indicator 312. In other words, zero pitch reference indicator 312 may be considered to be an extension of pitch ladder scale 310. Markings of pitch ladder scale 310 that appear above zero pitch reference indicator 312 correspond to positive pitch of the aircraft, and markings of pitch ladder scale 310 that appear below zero pitch reference indicator 312 correspond to negative pitch of the aircraft. The "intersection" of aircraft reference symbol 306 with pitch ladder scale 310 represents the current pitch of the aircraft, as indicated on pitch ladder scale 310.

During normal operation and for normal flight conditions, zero pitch reference indicator 312 is rendered in a conformal manner relative to terrain 302, and such that it moves (up and down) and rotates (clockwise and counterclockwise) within the primary display area in accordance with the current aircraft flight status. Moreover, pitch ladder scale 310 is dynamically rendered within the primary display area, and its scale markings and pitch measurement numbers may appear and disappear as needed to accommodate the positioning of pitch ladder scale 310 within primary flight display 300. For the embodiment depicted in FIG. 3, pitch ladder scale 310 has a roll axis that corresponds to the roll axis of the aircraft. In other words, as the aircraft rolls, pitch ladder scale 310 and zero pitch reference indicator 312 will rotate within primary flight display 300 about an imaginary roll axis that is perpendicular to the plane defined by the face of the display element.

TAG element 304 is preferably rendered in a conformal manner relative to the view of terrain 302. In practice, TAG element 304 could be rendered and driven according to one or more rules, e.g., vertical only, vertical and horizontal, greatest terrain clearance per unit time or distance, minimal control activation to deliver minimum terrain clearance, etc. As depicted in FIG. 3, TAG element 304 may be superimposed over terrain 302 or otherwise displayed on primary flight display 300. Notably, TAG element 304 includes a number of features and graphical elements that assist the pilot when potentially conflicting terrain is present. In this regard, TAG element 304 includes indicia of a desired navigation path that is intended to avoid terrain that obstructs the current flight path of the aircraft. For example, this particular embodiment of TAG element 304 is rendered with a generally T-shaped outer boundary 320 and a flight path clearance target indicator 322. Outer boundary 320 may be shaped and sized such that it serves as a desired route for flight path symbol 308, where the destination of that desired route results in an actual flight path of the aircraft that will clear the conflicting terrain. With this in mind, certain embodiments of the flight deck display system will render TAG element 304 and flight path symbol 308 in a cooperative or linked manner such that movement of flight path symbol 308 is constrained by outer boundary 320. In other words, although flight path symbol 308 may be free to move independently within primary flight display 300, TAG element 304 may generally follow the movement of flight path symbol 308. For such an embodiment, flight path symbol 308 will appear to move up and down along the major longitudinal axis of TAG element 304, and flight path symbol 308 will always be aligned with TAG element 304. Thus, flight path symbol 308 and TAG element 304 are both dynamically rendered such that flight path symbol 308 is aligned with the altitude or elevation axis of TAG element 304.

Flight path clearance target indicator 322 is a visual target above which the pilot should direct flight path symbol 308. In other words, flight path clearance target indicator 322 provides a quick and easy visual indicator of a safe flight path that will clear the conflicting terrain. For the embodiment shown in FIG. 3, flight path clearance target indicator 322 is actually the uppermost section of outer boundary 320. During flight, the pilot will strive to navigate the aircraft such that flight path symbol 308 moves above flight path clearance target indicator 322. At that time, TAG element 304 can be removed from primary flight display 300. Notably, the graphical display characteristics and features of TAG element 304 convey useful navigation, guidance, and aircraft control information to the pilot in the event of a detected terrain conflict. Such information may supplement the traditional "PULL UP" or "TERRAIN" warnings and alerts generated by conventional systems.

Notably, TAG element 304 can be dynamically rendered such that it rolls in concert with the aircraft and/or in concert with pitch ladder scale 310. For the embodiment depicted in FIG. 3, TAG element 304 has a roll axis that corresponds to the roll axis of the aircraft (and that corresponds to the roll axis of pitch ladder scale 310). In other words, as the aircraft rolls, TAG element 304 will also rotate within primary flight display 300 about an imaginary roll axis that is perpendicular to the plane defined by the face of the display element. Moreover, TAG element 304 may be rendered such that it is always centered and/or aligned with pitch ladder scale 310, as depicted in FIG. 3. Thus, TAG element 304 can remain somewhat pinned to pitch ladder scale 310 even though it is free to move up and down relative to pitch ladder scale 310 and even though the length and size of TAG element 304 may change over time.

In certain embodiments, flight path clearance target indicator 322 can be utilized to indicate a recommended climb angle that is needed to avoid terrain that obstructs the current flight path. For example, the rendered distance (D) between zero pitch reference indicator 312 and flight path clearance target indicator 322 corresponds to this desired climb angle. For the flight conditions depicted in FIG. 3, the desired climb angle is approximately 7.5 degrees.

In some embodiments, TAG element 304 itself could be rendered using visually distinguishable characteristics that indicate the relative severity or importance of the warning. For example, the area defined by the outer boundary of TAG element 304 could be rendered using different colors, hatching, or patterns that indicate relatively low priority warnings, intermediate priority warning, and urgent warnings. Such variable display characteristics for TAG element 304 would allow it to provide useful and early navigation guidance to the pilot. Thus, under certain conditions, TAG element 304 could be rendered to indicate an amber/caution level that indicates a desired yet not quite mandatory correction maneuver that can be followed to avoid a "PULL UP" warning. Moreover, an amber/caution status might initiate or prompt a different set of display rules that could guide the processing and display of TAG element 304. For example, amber/caution status might result in a somewhat gentle correction that gives adequate terrain clearance and takes the aircraft toward the flight plan. In contrast, a more urgent status might result in a more drastic correction that need not maintain the flight plan (at least in the immediate future).

Figure 4:
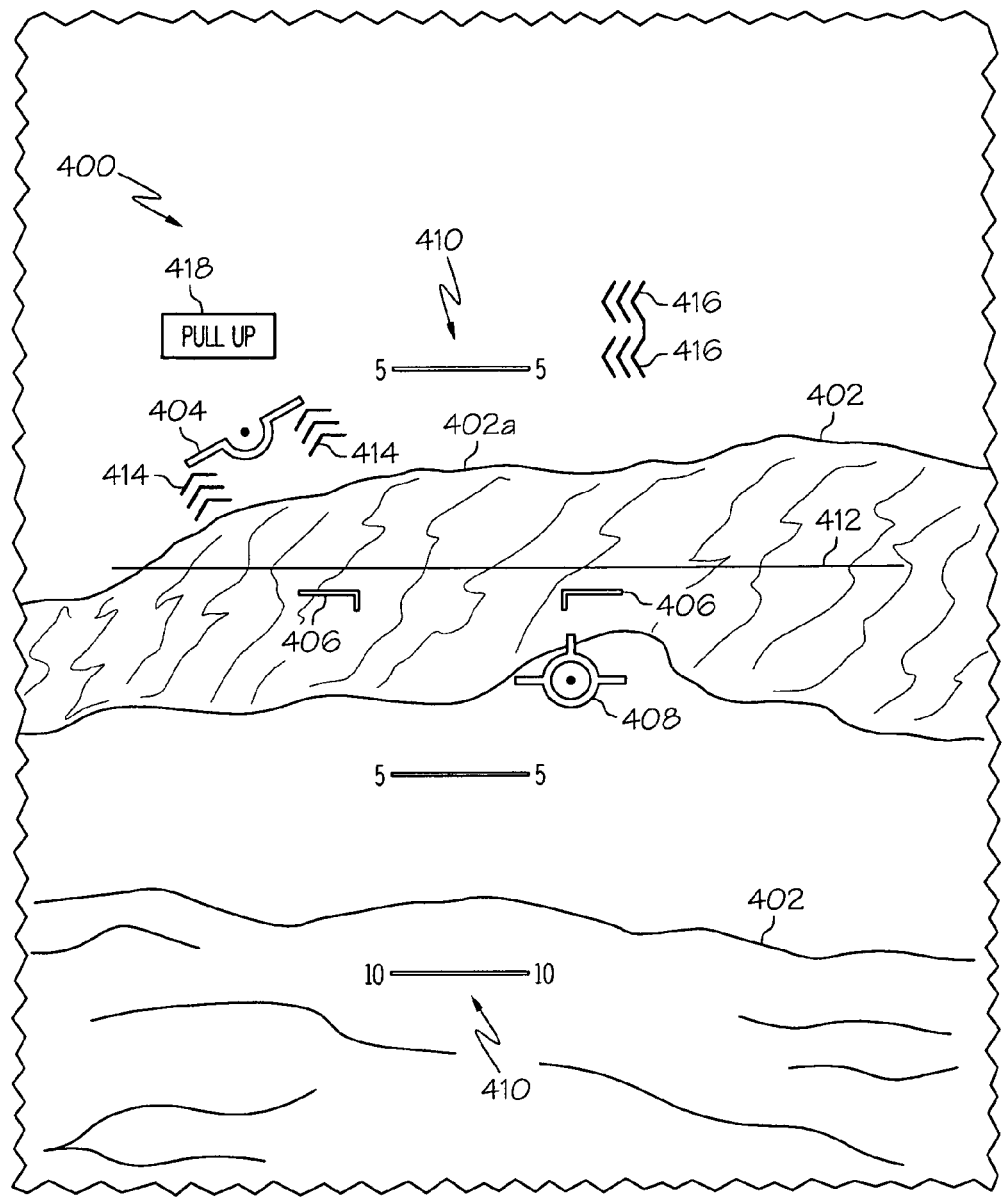

FIG. 4 depicts another embodiment of a graphical primary flight display 400 corresponding to a flight condition where potentially conflicting terrain has been detected. Primary flight display 400 includes graphical representations and images of a number of display elements that are similar or equivalent to counterpart elements described above with reference to FIG. 3. For the sake of brevity and simplicity, such common and equivalent features will not be redundantly described here with reference to primary flight display 400.

This embodiment of primary flight display 400 generally includes, without limitation: a perspective view of terrain 402; a TAG element 404; an aircraft reference symbol 406; a flight path symbol 408; a pitch ladder scale 410; and a zero pitch reference indicator 412. Notably, TAG element 404 and/or primary flight display 400 may also include suitably formatted and rendered indicia of aircraft control parameters that, when executed, will cause the aircraft to avoid the conflicting terrain. For this example, the conflicting terrain is a mountain or hill that is in the current flight path of the aircraft—primary flight display 400 shows this conflicting terrain 402a centered and aligned with aircraft reference symbol 406 and centered and aligned with pitch ladder scale 410.

TAG element 404 is rendered as a visibly distinguishable icon, and TAG element 404 need not be pinned, linked, or otherwise constrained to pitch ladder scale 410 or to flight path symbol 408. The TAG element 404 depicted in FIG. 4 resembles a portion of flight path symbol 408, and this indicates to the pilot that he or she should control the aircraft such that flight path symbol 408 migrates toward TAG element 404. For this embodiment, the entire TAG element 404 is positioned above the area of conflicting terrain, and the TAG element 404 itself represents the flight path clearance target indicator.

Notably, TAG element 404 is displayed at an angle, and that angle functions as a banking direction indicator. In FIG. 4, the orientation of TAG element 404 indicates that the desired navigation path mandates a left banking maneuver, which will direct the aircraft toward a lower section of the conflicting terrain. In contrast, if TAG element 404 were to be rotated clockwise about ninety degrees from its position shown in FIG. 4, then the desired navigation path would mandate a right banking maneuver. In this regard, the angular orientation of TAG element 404 relative to aircraft reference symbol 406 can serve as a bank angle rate indicator.

TAG element 404 also incorporates a climb rate indicator 414. Climb rate indicator 414 conveys a preferred climb rate for the desired navigation path. Although any suitable graphical element or feature can be used for climb rate indicator 414, this embodiment utilizes arrows or chevrons that point upward. In practice, the number of arrows or chevrons contained in climb rate indicator 414 represents the actual rate. In other words, one chevron might correspond to a relatively low climb rate, while four chevrons might correspond to a relatively high climb rate. The primary flight display may include a climb rate indicator, a banking direction indicator, a bank angle indicator, and/or other navigation indicators that are distinct and divorced from the TAG element. For example, primary flight display 400 includes arrows or chevrons 416 that point to the left. These chevrons indicate a left banking maneuver for the aircraft. In practice, the number of arrows or chevrons 416 represents the bank angle. In other words, one chevron might correspond to a relatively gentle bank or turn, while four chevrons might correspond to a relatively hard bank or turn. FIG. 4 also depicts a pop-up notification 418 that resembles a traditional "PULL UP" alert or warning. While not required, pop-up notification 418 may be displayed near TAG element 404 to reinforce the navigation control that should be executed.

Figure 5:
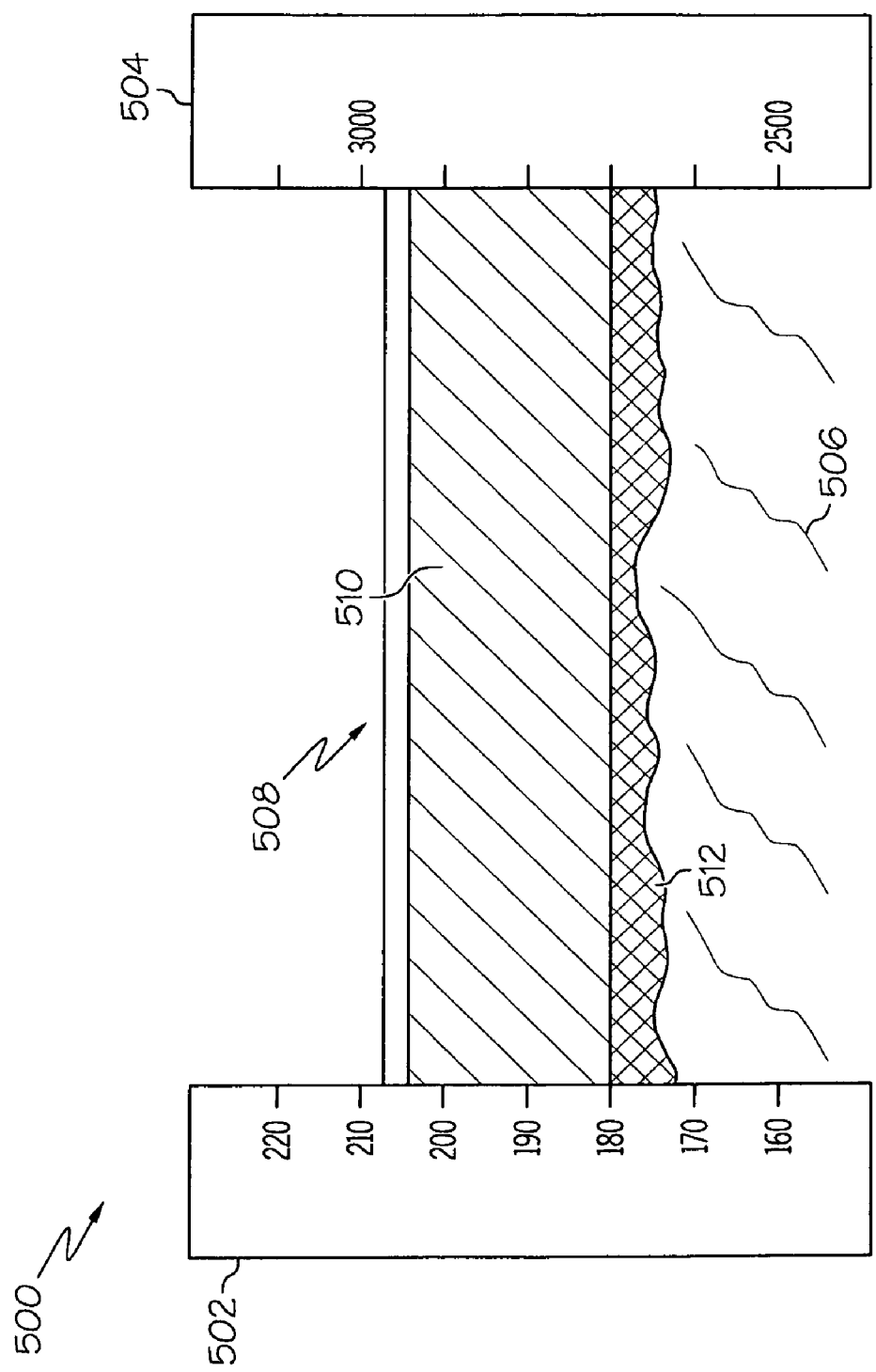

FIG. 5 depicts another embodiment of a graphical primary flight display 500. Primary flight display 500 may include a graphical airspeed tape 502, a graphical altimeter tape 504, rendered terrain 506, and a TAG element 508 that is rendered such that it remains located between airspeed tape 502 and altimeter tape 504. This version of TAG element 508 includes a TAG zone 510, which represents a desired flight path for purposes of clearing the offending terrain. In this regard, the goal of the pilot is to move the flight path symbol (not shown) into TAG zone 510. FIG. 5 also depicts a buffer zone 512 (illustrated using double cross hatching) that corresponds to an area above the offending terrain and below the lower boundary of TAG zone 510. Although the buffer zone 512 is clear of the offending terrain, it may be desirable to provide buffer zone 512 for an additional measure of safety. The height or elevation associated with buffer zone 512 may be predetermined or it may be user configurable.

Figure 6:
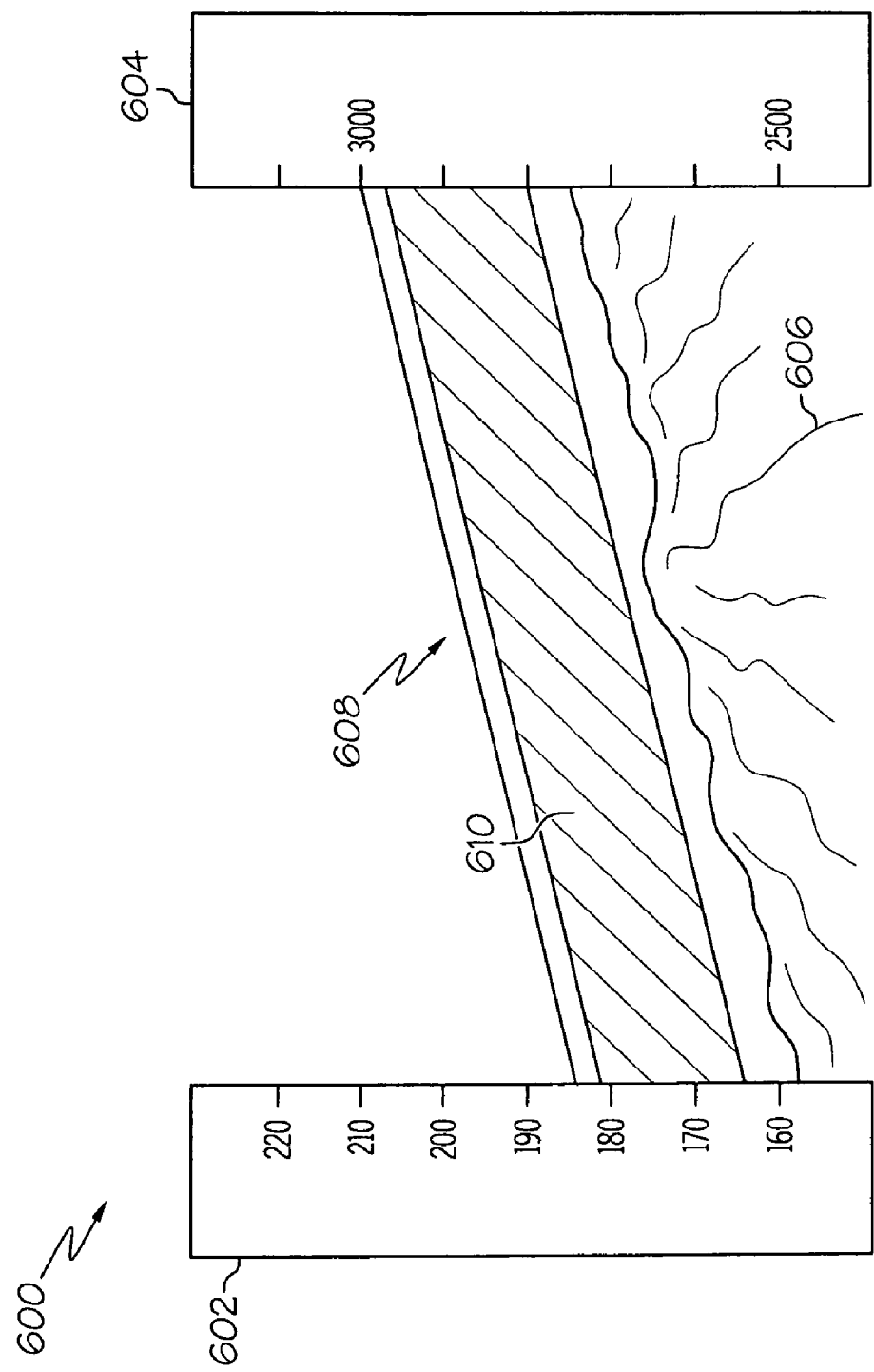

FIG. 6 depicts another embodiment of a graphical primary flight display 600, which is similar to primary flight display 500. Primary flight display 600 may include a graphical airspeed tape 602, a graphical altimeter tape 604, rendered terrain 606, and a TAG element 608 that is rendered such that it remains located between airspeed tape 602 and altimeter tape 604. This version of TAG element 608 includes a TAG zone 610, which represents a desired flight path for purposes of clearing the offending terrain. Notably, TAG element 608 can rotate or tilt about an axis that is located between airspeed tape 602 and altimeter tape 604. Rotation of TAG element 608 in this manner indicates a desired banking or climbing maneuver for the host aircraft. In this regard, if TAG element 608 is horizontal between airspeed tape 602 and altimeter tape 604, then the desired action is a climbing maneuver. On the other hand, if TAG element 608 is tilted (as depicted in FIG. 6), then the desired action includes a banking maneuver.

Figure 7:
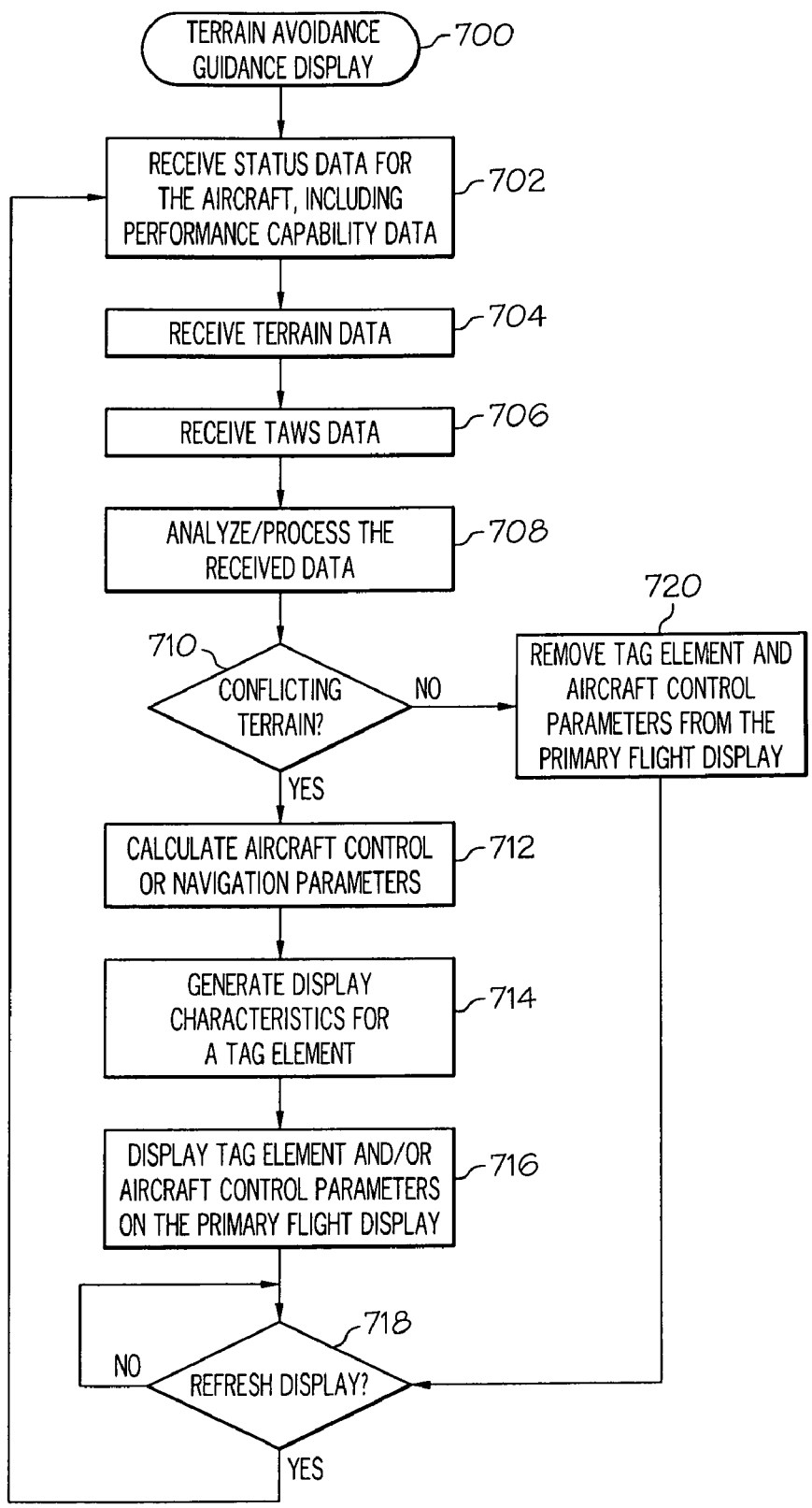
FIG. 7 is a flow chart that illustrates an exemplary embodiment of a process for displaying terrain avoidance guidance indicia.

In practice, a primary flight display having the features and elements described above can be generated and dynamically updated and refreshed in real-time (or substantially real-time) during flight. In this regard, FIG. 7 is a flow chart that illustrates an exemplary embodiment of a process 700 for displaying terrain avoidance guidance indicia on a flight deck display element. For the sake of brevity, conventional techniques related to the collection and processing of avionics data, the generation and rendering of graphics, computer graphics engines, and other functional aspects of the systems (and the individual operating components of the systems) may not be described in detail herein. The various tasks performed in connection with process 700 may be performed by software, hardware, firmware, or any combination thereof. For illustrative purposes, the following description of process 700 may refer to elements mentioned above in connection with FIGS. 2-6. In practice, portions of process 700 may be performed by different elements of the described system, e.g., a processor, a graphics engine, a display element, or a sensor. It should be appreciated that process 700 may include any number of additional or alternative tasks, the tasks shown in FIG. 7 need not be performed in the illustrated order, and process 700 may be incorporated into a more comprehensive procedure or process having additional functionality not described in detail herein.

In practice, process 700 can be performed in a virtually continuous manner at a relatively high refresh rate. For example, an iteration of process 700 could be performed at a rate of 12-40 Hz (or higher) such that the primary flight display will be updated in real-time or substantially real time in a dynamic manner. This particular embodiment of process 700 begins by receiving the current status data for the host aircraft (task 702). This current status data may include, among other items: attitude data (e.g., real-time pitch data and real-time roll data); altitude data; airspeed data; fuel status data; and/or performance capability data. As used here, performance capability data is any data related to the ability of the aircraft to perform flight maneuvers. For example, if all systems are operating normally, then the performance capability data may indicate that status. On the other hand, if any system or subsystem is operating at less than its normal or expected capacity, then the performance capability data may include a warning to that effect.

Process 700 also receives, obtains, or accesses terrain data corresponding to a flight deck viewpoint (task 704). As mentioned above, this terrain data represents the current image of the terrain as perceived from the cockpit view. In certain embodiments, process 700 also receives, obtains, or accesses TAWS data that indicates whether or not conflicting terrain might be in the flight path of the aircraft. The received/obtained data for the aircraft is then analyzed and processed in an appropriate manner (task 708) to generate applicable image rendering display commands that correspond to the primary flight display for the aircraft. The image rendering display commands are based upon or otherwise influenced by the current data—the graphical display characteristics of the primary flight display are dependent upon the current status data, including the terrain data, the performance capability data, and the TAWS data. The image rendering display commands are then used to control the rendering of the primary flight display on a display element.

If process 700 detects that the TAWS data indicates the presence of conflicting terrain that obstructs the current flight path of the aircraft (query task 710), then the system calculates one or more aircraft control, command, or navigation parameters (task 712) that, when executed, will cause the aircraft to avoid the conflicting terrain. Task 712 may be associated with the execution of an appropriate software program or algorithm that considers the current flight status, the surrounding terrain, and the performance capability data and, in response to that data, determines a preferred navigation route that will steer the aircraft clear of the offending terrain. In addition, process 700 may generate display characteristics of a TAG element (task 714), where at least some of those characteristics are based upon the calculated aircraft control parameters. This enables the primary flight display to render the TAG element with graphical features and elements (described above) that convey the desired navigation guidance commands to the pilot.

Then, process 700 can display the TAG element and/or indicia of one or more aircraft control parameters on the primary flight display (task 716). This indicia may include, without limitation: a climb rate indicator; a banking direction indicator; a bank angle indicator; or the like (as described above). The TAG element may include any of the features and elements mentioned above with reference to FIGS. 3-6. Notably, the performance capability data may influence the positioning and rendering of the TAG element relative to the terrain. For example, FIG. 4 corresponds to a situation where the performance capability data suggests that the aircraft may not be able to safely climb over the approaching mountain without banking to the left. In other words, it may not be possible for the aircraft to climb straight over the conflicting terrain. Thus, the system can process this performance capability data to determine that the aircraft can easily traverse the offending terrain if it performs a banked climb maneuver, which is indicated by TAG element 404. In other words, process 700 need not only consider a straight line flight path, and process 700 can consider the practical operating limitations of the aircraft when calculating the desired navigation route to clear the offending terrain.

If it is time to refresh the display (query task 718), then process 700 leads back to task 702 to obtain the most current data. If not, then the current state of the primary flight display is maintained. The relatively high refresh rate of process 700 results in a relatively seamless and immediate updating of the display. Thus, process 700 is iteratively repeated to update the graphical representations of the terrain, flight path symbol, TAG element, pitch ladder scale, and other elements of the primary flight display. Referring again to query task 710, if process 700 detects that the TAWS data no longer indicates the presence of conflicting terrain, then the TAG element and the associated aircraft control parameter indicators can be removed from the primary flight display (task 720). Thus, the TAG element and the navigation guidance indicia need not be displayed unless a terrain conflict has been detected and remains present. If conflicting terrain is not present, then the primary flight display will be rendered in a simplified manner, relative to that shown in FIGS. 3-6.

In practice, process 700 can be repeated indefinitely and at any practical rate to support continuous and dynamic updating and refreshing of the primary flight display and, in particular, the TAG element and associated terrain avoidance guidance information. Frequent updating of the primary flight display enables the flight crew to obtain and respond to the current flight situation in virtually real-time.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A flight deck display element for an aircraft, the flight deck display element having rendered thereon a primary flight display comprising:
   a view of terrain corresponding to a viewpoint from the flight deck;
   a flight path symbol that represents a flight path of the aircraft, the flight path symbol being rendered in a conformal manner relative to the view of terrain; and
   a terrain avoidance guidance (TAG) element rendered in a conformal manner relative to the view of terrain, wherein the TAG element has an outer boundary and movement of the TAG element is generally constrained by the flight path symbol such that the flight path symbol remains within the outer boundary.

2. The flight deck display element of claim 1, wherein:
   the primary flight display further comprises a pitch ladder scale rendered in a conformal manner relative to the view of terrain;
   the pitch ladder scale has a first roll axis corresponding to the roll axis of the aircraft; and
   the TAG element has a second roll axis corresponding to the roll axis of the aircraft.

3. A flight deck display element for an aircraft, the flight deck display element having rendered thereon a primary flight display comprising:
   a view of terrain corresponding to a viewpoint from the flight deck;
   a flight path symbol that represents a flight path of the aircraft, the flight path symbol being rendered in a conformal manner relative to the view of terrain; and
   a terrain avoidance guidance (TAG) element rendered in a conformal manner relative to the view of terrain, wherein the TAG element is always constrained or aligned with the flight path symbol.

4. A flight deck display element for an aircraft, the flight deck display element having rendered thereon a primary flight display comprising:
   a view of terrain corresponding to a viewpoint from the flight deck;
   a flight path symbol that represents a flight path of the aircraft, the flight path symbol being rendered in a conformal manner relative to the view of terrain; and
   a terrain avoidance guidance (TAG) element rendered in a conformal manner relative to the view of terrain, wherein:
   the primary flight display further comprises a zero pitch reference indicator rendered in a conformal manner relative to the view of terrain;
   the TAG element comprises at least one flight path clearance target indicator; and
   a rendered distance between the zero pitch reference indicator and the at least one flight path clearance target indicator corresponds to recommended climb angles needed to avoid terrain that obstructs a current flight path of the aircraft.

5. The flight deck display element of claim 1, wherein the TAG element comprises indicia of a desired navigation path intended to avoid terrain that obstructs a current flight path of the aircraft.

6. The flight deck display element of claim 5, wherein the indicia comprises a climb rate indicator.

7. The flight deck display element of claim 5, wherein the indicia comprises a banking direction indicator.

8. The flight deck display element of claim 5, wherein the indicia comprises a bank angle indicator.

9. The flight deck display element of claim 5, wherein the indicia comprises a flight path clearance target indicator.

10. The flight deck display element of claim 1, wherein the TAG element is superimposed over the view of terrain.

11. A flight deck display system for an aircraft, the system comprising:
   a processor architecture configured to receive real-time aircraft data and terrain data for the aircraft and, based upon the real-time aircraft data and the terrain data, generate image rendering display commands; and
   a display element that receives the image rendering display commands and, in response thereto, renders a primary flight display that comprises a conformal view of terrain corresponding to a flight deck viewpoint, and that comprises a conformal terrain avoidance guidance (TAG) element on the view of terrain, the TAG element comprising indicia of a desired navigation path intended to avoid terrain that obstructs a current flight path of the aircraft, wherein:
   the primary flight display further comprises a conformal flight path symbol that represents the current flight path of the aircraft; and
   the flight path symbol and the TAG element are dynamically rendered such that the flight path symbol is always aligned with an altitude axis of the TAG element.

12. The system of claim 11, wherein:
   the view of terrain includes an area of conflicting terrain that corresponds to the terrain that obstructs the current flight path of the aircraft;
   the TAG element is positioned above the area of conflicting terrain; and
   the TAG element represents a flight path clearance target indicator.

13. A method for displaying information on a flight deck display element of an aircraft, the method comprising:
   receiving terrain avoidance and warning system (TAWS) data for the aircraft;
   receiving terrain data corresponding to a flight deck viewpoint; and
   in response to the TAWS data and the terrain data, displaying a primary flight display on the flight deck display element, the primary flight display comprising a conformal view of terrain corresponding to the terrain data, a flight path symbol that represents a current flight path of the aircraft, and a conformal terrain avoidance guidance (TAG) element that visually indicates aircraft control parameters that when executed will cause the aircraft to clear conflicting terrain that obstructs the current flight path of the aircraft, wherein the TAG element is always constrained by or aligned with the flight path symbol.

14. The method of claim 13, further comprising:
   detecting when the TAWS data no longer indicates presence of conflicting terrain that obstructs the current flight path of the aircraft; and
   thereafter removing the TAG element from the primary flight display.

15. The method of claim 13, further comprising:
   calculating the aircraft control parameters in response to the TAWS data and the terrain data; and
   generating display characteristics of the TAG element based upon the aircraft control parameters.

16. The method of claim 13, further comprising displaying a climb rate indicator on the flight deck display element, the climb rate indicator visually indicating a desired climb rate of the aircraft for avoiding the conflicting terrain.

17. The method of claim 13, further comprising displaying a banking direction indicator on the flight deck display element, the banking direction indicator visually indicating a desired banking direction of the aircraft for avoiding the conflicting terrain.

18. The method of claim 13, further comprising displaying a bank angle indicator on the flight deck display element, the bank angle indicator visually indicating a desired bank angle of the aircraft for avoiding the conflicting terrain.

* * * * *